United States Patent [19]

Nakazawa et al.

[11] Patent Number: 5,125,095

[45] Date of Patent: Jun. 23, 1992

[54] SYSTEM USING MICROPROCESSOR ADDRESS LINES FOR COPROCESSOR SELECTION WITHIN A MULTI-COPROCESSOR APPARATUS

[75] Inventors: Takuichiro Nakazawa, Kodaira; Makoto Hanawa, Kokubunji; Atsushi Hasegawa, Koganei; Ikuya Kawasaki, Tokyo; Kazuhiko Iwasaki, Hachiohji; Shigeki Morinaga, Hitachi; Hisashi Kaziwara, Hitachi; Takeshi Asai, Hitachi; Junichi Tatezaki, Kodaira, all of Japan

[73] Assignees: Hitachi Microcomputer Engineering Ltd.; Hitachi, Ltd.; Hitachi Engineering Co., Ltd., all of Tokyo, Japan

[21] Appl. No.: 678,906

[22] Filed: Mar. 28, 1991

Related U.S. Application Data

[63] Continuation of Ser. No. 183,895, Apr. 20, 1988, abandoned.

[30] Foreign Application Priority Data

Apr. 20, 1987 [JP] Japan ................................. 62-95180

[51] Int. Cl.⁵ ............................................. G06F 15/16
[52] U.S. Cl. ................................. 395/800; 364/228.6; 364/DIG. 1
[58] Field of Search ... 364/200 MS File, 900 MS File

[56] References Cited

U.S. PATENT DOCUMENTS

| | | | |
|---|---|---|---|
| 4,775,931 | 10/1988 | Dickie et al. | 364/200 |
| 4,809,169 | 2/1989 | Sfarti et al. | 364/200 |
| 4,868,735 | 11/1989 | Moller et al. | 364/200 |
| 4,926,318 | 5/1990 | Nakayama | 364/200 |

FOREIGN PATENT DOCUMENTS 2011548 3/1984 Japan.

Primary Examiner—Thomas C. Lee
Assistant Examiner—Robert B. Harrell
Attorney, Agent, or Firm—Fay, Sharpe, Beall, Fagan, Minnich & McKee

[57] ABSTRACT

A microcomputer system has a microprocessor and a number of independent coprocessors for executing individual instructions according to instruction data sent from the microprocessor. An address bus and a data bus interconnect the coprocessors with the microprocessor. The microprocessor sends instruction data to the coprocessors via the data bus and concurrently sends coprocessor designation data to the coprocessors via the address bus. The coprocessor designated by the designation data reads and reacts to the instruction data while the other coprocessors within the system disregard the instruction data.

13 Claims, 4 Drawing Sheets

SYSTEM USING MICROPROCESSOR ADDRESS LINES FOR COPROCESSOR SELECTION WITHIN A MULTI-COPROCESSOR APPARATUS

This is a continuation of copending application(s) Ser. No. 07/183,895 filed on Apr. 20, 1988, now abandoned.

BACKGROUND OF THE INVENTION

The present invention relates to data processing technology, and more specifically to technology that can be effectively adapted to identifying processors in a system to which a plurality of processors are coupled, such as a system for designating coprocessors in a microcomputer system that has a plurality of coprocessors of the same kind.

In a microprocessor having high functions such as of 16 bits or 32 bits, a system is often constituted by coupling coprocessors such as FPU's (floating point units) in order to carry out numerical operations at high speeds. In addition to the above FPU's, the coprocessors are designed in a variety of other ways depending upon the applications and must be used selectively to meet the objects. Further, it may often be desired to operate coprocessors of the same kind in parallel or in a multiplexed manner. Therefore, a system having a plurality of coprocessors requires a method of identifying the coprocessors.

According to a conventional method of identifying the coprocessors in a system that has coprocessors, a coprocessor identification field is provided in an instruction word of the microprocessor, and a code of the identification field is sent onto an address bus at the time of executing the coprocessor instruction. Then, the coprocessor identification code is decoded by, for example, an external decoder to form a chip select signal which activates the designated coprocessor (see Japanese Patent Laid-Open No. 201154/1984).

In the above coprocessor identification system where the microprocessor instruction contains a coprocessor identification field, extension of the processor instruction set is limited by the width of the identification field. The conventional coprocessor identification system requires an external circuit to decode the identification field. Moreover, the conventional coprocessor identification system is limited to applications where the identification code of the coprocessor is fixed. Further, when a system using a plurality of coprocessors of the same type are operated in a multiplexed manner, it is not possible to distinguish one coprocessor from the other coprocessors with a single instruction. To make such a distinction, therefore, it is necessary to carry out the decoding operation which is quite different from the above-mentioned operation. Therefore, the instruction word must be furnished with data (code) that helps identify that the instruction is a coprocessor instruction even though it is apparent that the instruction is a coprocessor instruction.

SUMMARY OF THE INVENTION

The object of the present invention is to increase the degree of freedom for extending the instruction of a highly functional microprocessor.

Another object of the present invention is to provide a general-purpose coprocessor interface that can be used for a computer system employing coprocessors, and to increase the throughput of the system.

The above and other objects as well as novel features of the present invention will become obvious from the description of the specification and the accompanying drawings.

A representative example of the invention disclosed in this application will now be described briefly.

Bits for storing a coprocessor identification code (number) are provided in a user accessible portion of the control registers, such as status display registers, in a microprocessor. The coprocessor identification code in the control register is sent to the external unit when the coprocessor instruction is executed.

The control register can be stored on a stack during exception processing due to an interrupt or the like.

According to the above-mentioned means, the extensibility of the instruction set can be increased without providing a coprocessor identification field in an instruction word of the microprocessor, and even coprocessors of the same kind can be identified by assigning each one a separate identification number. This schema enables a plurality of coprocessors of the same kind to be operated in parallel or in a multiplex manner, thus providing a general purpose coprocessor interface and increasing the throughput of the system.

DESCRIPTION OF THE PREFERRED EMBODIMENT

Figure 1:
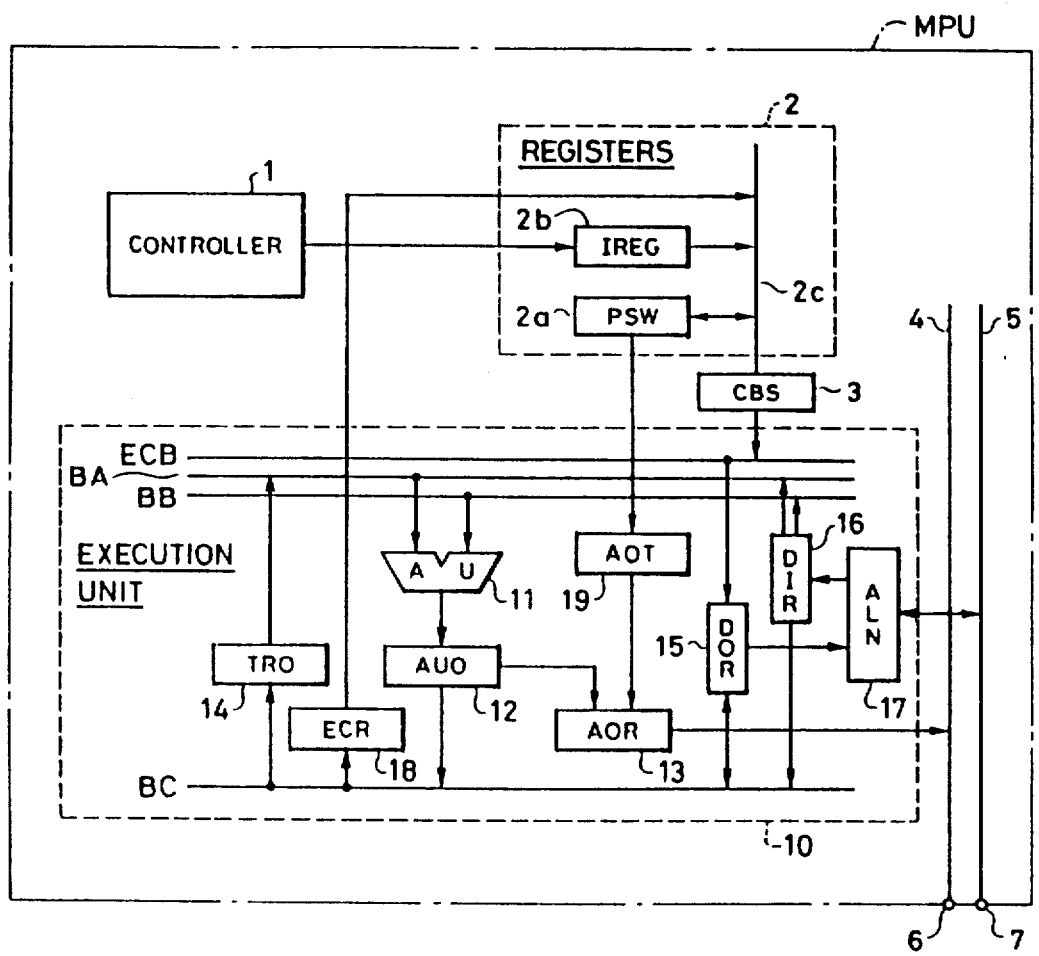
FIG. 1 is a block diagram illustrating a microprocessor according to an embodiment of the present invention.

FIG. 1 illustrates a microprocessor according to an embodiment of the present invention.

In FIG. 1, reference numeral 1 denotes a controller which consists of an instruction register, a sequence controller or a control decoder that forms a series of micro instructions from the contents fetched from the instruction register and that further form processor control signals based upon the micro instructions.

Reference numeral 2 denotes register groups consisting of general purpose registers used as data registers, address registers, and control registers. Examples of control registers are an instruction register 2b for storing stack pointers, immediate values and commands for the coprocessors and a status register (status display register) 2a for displaying the status in the processor. The content in the register group 2 is supplied to an execution unit 10 via a CCB bus 2c and a control register value output register 3.

The execution unit 10 consists of an arithmetic unit 11 (AU) that performs address operations, an address temporary register 12 (AUO) that holds the result of an address operation, and address output register 13 (AOR), a temporary register 14 (TRO) that temporarily holds the operated value, a data output register 15 (DOR) and a data input register 16 (DIR), a data aligner 17 (ALN) for changing the byte arrangement of data that are input from or output to the data bus, and a temporary register 18 (ECR) that temporarily holds the data transferred from the execution unit 10 to the register group 2.

The address and data processed in the execution unit 10 are sent from the address output register 13 and the data aligner 17 to an address pin 6 and a data pin 7 via an internal address bus 4 and an internal data bus 5, respectively. The data received from the external side is input to the data alinger 17 via data bus 5 and is placed on a bus BA, BB, or BC in the execution unit 10 via data input register 16.

In this embodiment, furthermore, a portion of the status register 2a in the register group 2 is provided with a coprocessor designation region PID on which will be written an identification number consisting of, for example, a three bit code that designates an external coprocessor. The coprocessor designation region PID is provided in a portion of a region where the data can be read or written by a user program in the status register 2a. Though there is no particular limitation, the embodiment of FIG. 1 is provided with the register 19 (AOT) that can transfer the code of the coprocessor designation region PID in the status register 2a. The three bit code received by the register 19 is supplied to the address output register 13 and is produced onto the second to fourth bits of an external system address bus via address bus 4. The identification code is set onto the PID region of the status register 2a by the temporary register 18 (ECR) connected to the bus BC in the execution unit 10 via CCB bus 2c.

The status register is placed on the stack when an exception is generated from an incorrect instruction, interrupt, bus error, reset or the like.

Figure 2:
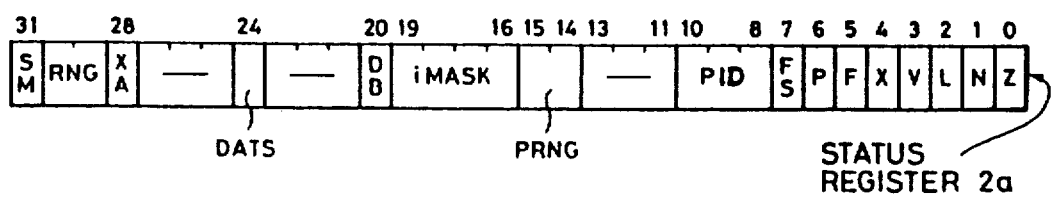
FIG. 2 is a diagram illustrating the bit structure of a control register where a coprocessor identification region is provided.

FIG. 2 illustrates the structure of the status register 2a in a 32 bit microprocessor.

In this status register, the flag region is comprised of eight bits from the 0-th bit to the seventh bit. This region consists of a flag Z that indicates an all zero result from an operation, a flag N that indicates the most significant bit in the result of operation, a flag L that indicates an operation result is positive or negative, a flag V that indicates overflow, a flag X used for the multilength arithmetic, a flag F used for setting finish conditions, a flag P that indicates pointer bit error, and a flag FS that indicates a decimal function select.

In the status register 2a of this embodiment, furthermore, sixteen bits from the 0-th bit to the fifteenth bit form a region accessible by a user program. This region provides an initial ring number indicator region PRNG of two bits as well as the above-mentioned coprocessor designation region PID. The initial ring number indicator region PRNG indicates a prior ring which called the ring (control hierarchy) now being executed by the processor in the hierarchical control structure. The eleventh to thirteenth bits form a reserve region.

A region iMASK which designates the order of interrupt masks is assigned to the four bits from the sixteenth bit to the nineteenth bit in the status register 2a, a flag DB used during the debugging mode is assigned to the twentieth bit, a flag DATS which designates the on/off state of the address conversion is assigned to the twenty-fourth bit, a flag XA which indicates the address extension mode is assigned to the twenty-eighth bit, a region RNG which indicates the number of the ring that is now being executed is assigned to the twenty-ninth and thirtieth bits, and a flag SM that indicates the selected condition of the stack pointer to be used is assigned to the thirty-first bit. The twenty-first to twenty-third bits and the twenty-fifth to twenty-seventh bits form reserve regions. In the status register 2a, the sixteenth to thirty-first bits form a region where the data cannot be read or written under the user condition though there is no particular limitation.

In the processor having the above-mentioned status register 2a, a coprocessor identification code is put into the coprocessor designation region PID in the status register 2a and is transferred to the coprocessor together with the coprocessor command for execution. Thus, a coprocessor identification field in the instruction word is needed.

Figure 3:
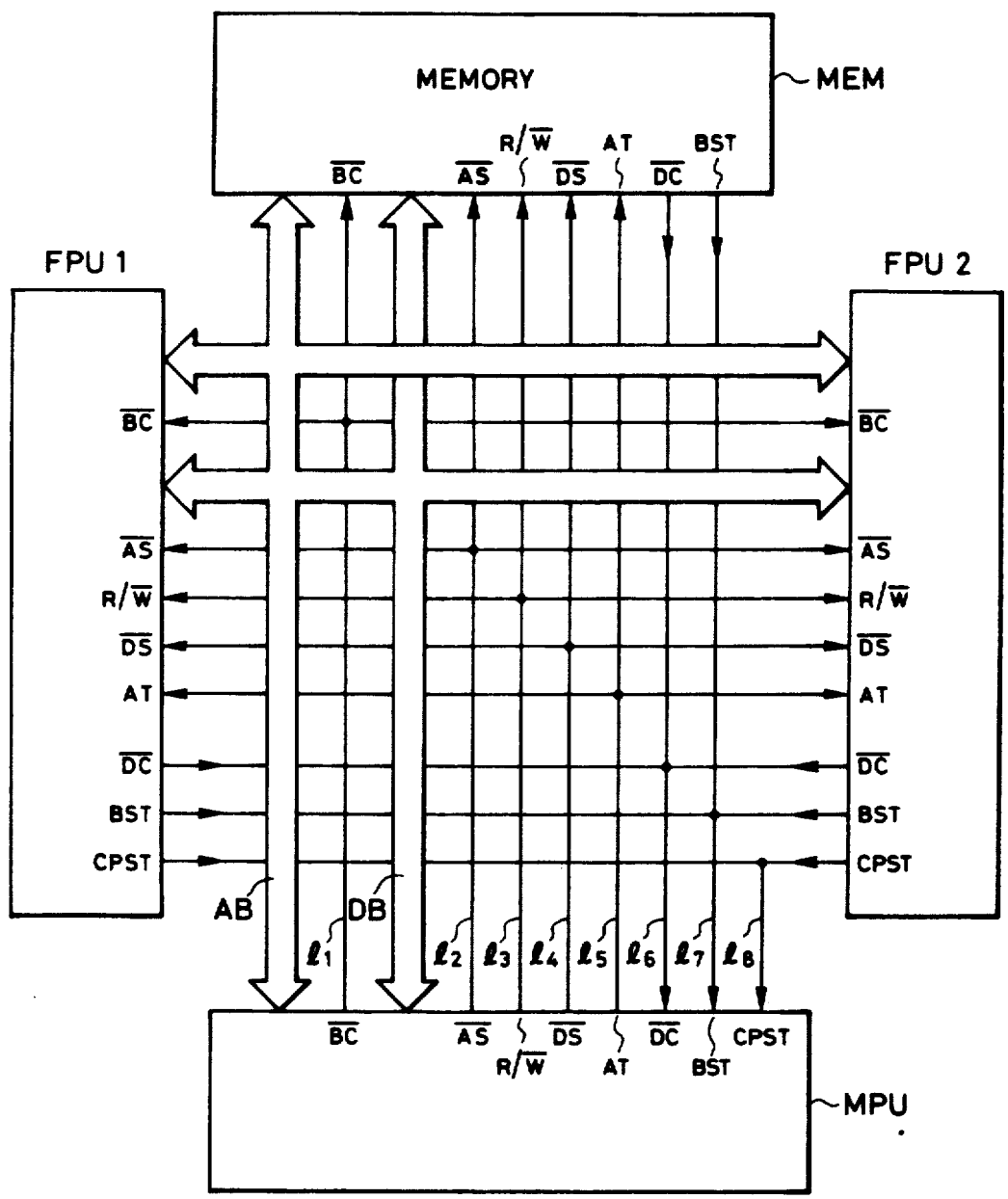
FIG. 3 is a diagram illustrating the structure of a system which employs a microprocessor and floating point coprocessors according to the present invention; and, FIGS. 4A and 4B illustrate, in a divided manner, a flow chart of the operation procedure of the above-mentioned system.

FIG. 3 illustrates a system which employs the microprocessor of FIG. 1 and two coprocessors. The symbol MPU denotes the microprocessor, symbols FPU1 and FPU2 denote the coprocessors such as floating point processors, and MEM denotes a main memory. These LSIs are linked together through a system address bus AB and a system data bus DB. There are also control signal lines $l_1$ to $l_8$ for transmitting a variety of control signals $\overline{BC}$, $\overline{AS}$, $R/\overline{W}$, $\overline{DS}$, AT, $\overline{DC}$, BST, and CPS for hand shaking.

In FIG. 3, the control signal $\overline{BC}$ designates the arrangement of data stored in the memory MEM, the control signal $\overline{AS}$ indicates that the address produced from the microprocessor has been determined, the signal $R/\overline{W}$ designates a memory read or write, the signal $\overline{DS}$ indicates that the data on the bus has been determined, and the signal AT indicates a coprocessor command transfer request, operand transfer request, or what kind of bus cycle is requested by the microprocessor. The signal AT is comprised of three bits and indicates a coprocessor command transfer request when the bits are in a logical 110 state and a operand transfer request when the logical state is 100. Further, the memory signal $\overline{DC}$ reports to the MPU that the data on the bus has been read or that data has been placed onto the bus, the signal BST informs the MPU of the bus status, and signal CPST informs the MPU of the coprocessor status (e.g., completion or reception of command).

In this embodiment, an identification number is predetermined for the coprocessors FPU1 and FPU2. Each coprocessor has software which compares the identification code received from the microprocessor MPU with the predetermined identification number to determine whether the command (coprocessor instruction) is for FPU1 or FPU2.

A procedure for executing the coprocessor instruction in a system having the above two coprocessors will now be described in conjunction with FIGS. 4A and 4B.

Figure 4A:
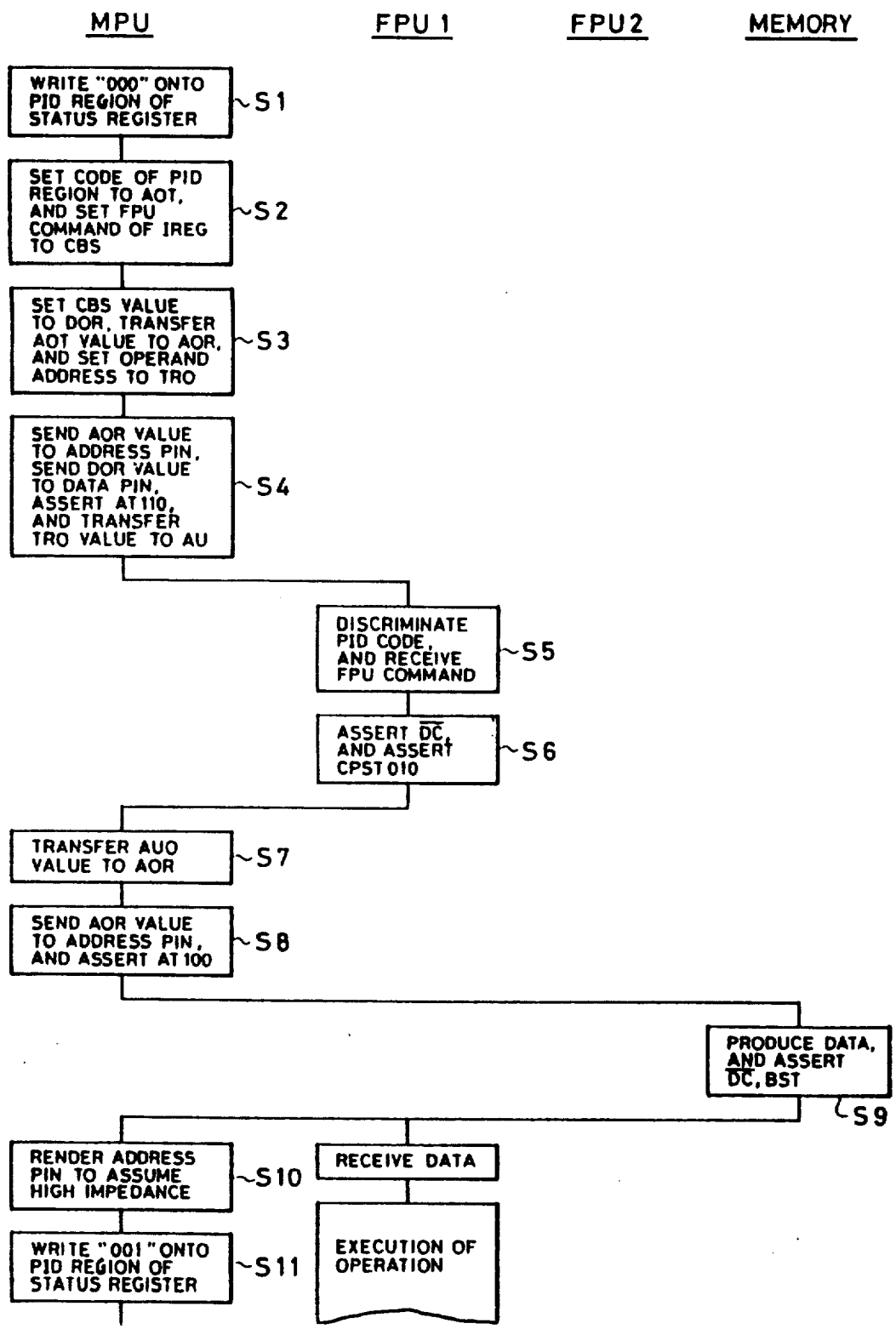
Figure 4B:
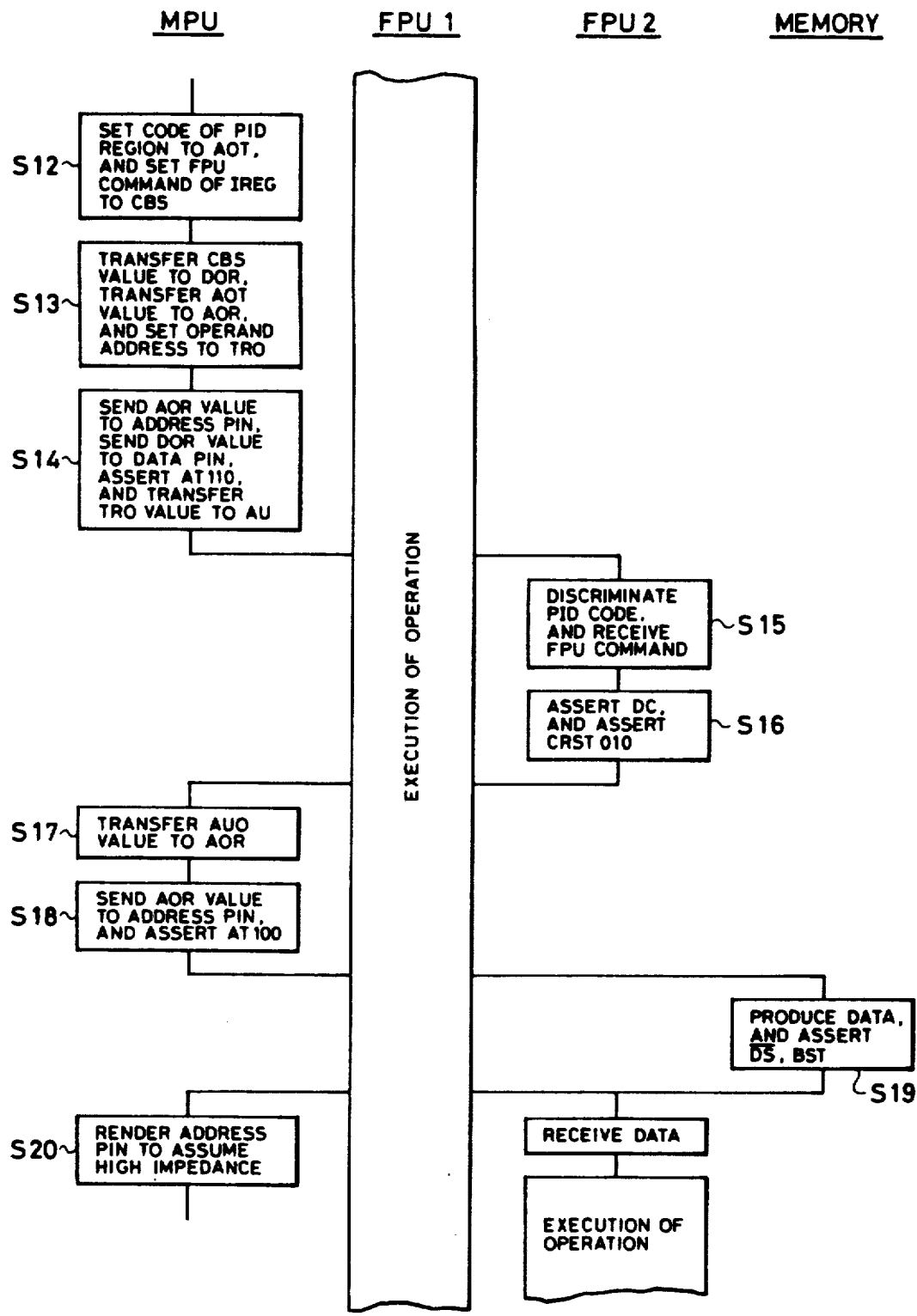

The flow chart in FIGS. 4A and 4B illustrates the logic flow when the microprocessor MPU gives a floating point arithmetic command to the first coprocessor FPU1 and then gives a floating point arithmetic command to the second coprocessor FPU2 while the coprocessor FPU1 is carrying out the first commanded operation.

In the following description of this embodiment, it is presumed that an identification code "000" is given to the coprocessor FPU1 and another identification code "001" is given to the other coprocessor FPU2.

First, the microprocessor MPU writes the identification code "000" of the first coprocessor FPU1 into the coprocessor designation region PID of the status register 2a (step S1). The identification code in the coprocessor designation region PID is then transferred to the register AOT (see FIG. 1), and a coprocessor command (hereinafter referred to as FPU command) in the instruction register IREG is transferred to the control register value output register CBS (step S2). The value of the register CBS is written to the data output register DOR, the identification code in register AOT is transferred to the address output register AOR, and the operand address is written to the temporary register TRO (step S3).

Thereafter, the value of the address output register AOR is sent to the address pin 6 via internal address bus 4, and the value of the data output register DOR is sent to the data pin 7 via internal data bus 5. A FPU command transfer request signal AT110 is asserted, and the operand address in the temporary register TRO is supplied to an arithmetic unit AU (step S4).

The coprocessor FPU1 which has received the transfer request signal ATI10 compares the identification number (PID code) and accepts the FPU command from the data bus DB when the PID number is the same as its own number (step S5). FPU1 then asserts a signal $\overline{DC}$ that indicates the completion of data acceptance and further asserts a signal CPST010 that indicates the completion of FPU command acceptance (Step S6).

Next, upon receipt of the signals $\overline{DC}$ and CPST010, the microprocessor MPU sends the result of the address operation in the arithmetic unit AU to the address output register AOR from the register AUO (step S7). The value of the address output register AOR is sent to the address pin via address but 4 and, then, the coprocessor operand transfer request signal AT100 is asserted (step S8).

The memory MEM is then accessed via system bus to produce data from the designated address. The signal $\overline{DC}$ is asserted to indicate the data is ready and on the bus and the signal BST is asserted to indicate this bus status (step S9).

The coprocessor FPU1 takes the data from the system bus in response to the control signals $\overline{DC}$ and BST, and commences the arithmetic operation indicated by the FPU command.

In parallel with the coprocessor FPU1's data reception and arithmetic operation, the microprocessor MPU causes the address pin to assume a high impedance state (step S10) and then writes "001" onto the coprocessor designation region PID of the status register 2a (step S11). The valve "001" is the identification code of the second coprocessor FPU2.

Next, the instruction code in the coprocessor designation region PID is sent to the register AOT, and the FPU command in the instruction register IREG is transferred to the control register value output register CBS (step S12). The value of the register CBS is sent to the data output register DOR, the identification code in the register AOT is transferred to the address output register AOR, and the operand address is set to the temporary register TRO (step S13).

Then, the value of the address output register AOR is sent to the address pin 6 via internal address bus 4 and the value of the data output register DOR is sent to the data pin 7 via internal data bus 5. The FPU command transfer request signal AT110 is asserted, and the operand address in the temporary register TRO is supplied to the arithmetic unit AU (step S14).

The coprocessor FPU2 that has received the transfer request signal ATI10 compares the identification number (PID code) and accepts the FPU command from the data bus DB when it is the same as its own number (step S15). FPU2 then asserts the signal $\overline{DC}$ to indicate the completion of data acceptance and asserts the signal CPST010 to indicate the completion of FPU command acceptance (step S16).

Upon receipt of the signals $\overline{DC}$ and CPST010, the microprocessor MPU sets the result of the address operation in the arithmetic unit AU to the address output register AOR from the register AUO (step S17). The microprocessor then sends a value of the address output register AOR to the address pin via address bus 4 and asserts the coprocessor operand transfer request signal AT100 (step S18).

The memory MEM is accessed via the system bus to produce data from the designated address. The signal DC is asserted to indicate the data is ready and on the bus and the signal BST is asserted to indicate this bus status (step S19).

In response to the control signals $\overline{DC}$ and BST, the coprocessor FPU2 accepts the data from the system bus and commences the arithmetic operation indicated by the FPU command.

The microprocessor MPU receives the data from the coprocessor FPU2 and causes the address pin to assume a high impedance state in parallel with the commencement of arithmetic operation of FPU2.

In the conventional system where the identification code of the coprocessor is fixed, operation of coprocessors of the same kind in parallel or in a multiplexed manner is not feasible. The above-mentioned embodiment permits changes in the identification number of the coprocessor by the user to provide greater flexibility in utilization of the coprocessors. Furthermore, even coprocessors of the same type can be easily operated in parallel or in a multiplexed manner.

In the above-mentioned embodiment, the coprocessor designation region PID provided in the status register 2a is comprised of three bits to identify a maximum of eight coprocessors. However, the number of bits of the coprocessor designation region PID is not limited to three but can be selected arbitrarily in relation to other regions such as a flag region of the control register.

According to the embodiment of the invention as described above, the coprocessor designation region used for storing the coprocessor identification code (number) in the control registers such as status registers in a microprocessor is accessible by a user program. The coprocessor identification code in the status registers is sent to the external unit when the coprocessor instruction is executed. Therefore, there is no need of providing a coprocessor identification field in the instruction word of the microprocessor making it possible to increase the future instruction set of the microprocessors.

Further, the coprocessor identification region used in the control registers such as status registers in the microprocessor for storing the coprocessor identification code (number) is accessible by a user program. The coprocessor identification code in the status registers is sent to the external unit when the coprocessor instruction is executed. Therefore, even coprocessors of the same kind can be identified by assigning each a different identification number, and a plurality of coprocessors of the same kind can be operated in a parallel or in a multiplexed manner enabling the coprocessor interface to meet general purposes.

Moreover, since the coprocessor identification region is user accessible and the coprocessor identification code in the status register is sent to the external unit when the coprocessor instruction is executed, the status registers can be preserved during the processing of an exception due to an interrupt by placing them in the stack region. Therefore, even during exception processing it is possible to learn which coprocessor was executing the instruction. Furthermore, the coprocessor designation region PID is preserved in the stack region and is returned to the initial status register after the exception processing is finished. Therefore, the processing is simplified at the time when the instruction execution is started again, the initial program can be executed again immediately, and throughput of the system increases.

Moreover, since each of the coprocessors identifies the identification code in software, there is no need for an external decoder circuit and the system design is simplified.

The foregoing described the preferred embodiment of the invention. However, it should be noted that the present invention is in no way limited to the above-mentioned embodiment but can be modified in a variety of other ways within a scope that does not depart from the gist of the invention. In the above-mentioned embodiment, for example, the coprocessor designation region is provided in a status register than can be preserved during interrupt processing. It is, however, also possible to provide the coprocessor designation region in a region of the status register that does not take refuge or in a control register other than the status register.

The foregoing description chiefly dealt with the case where the invention was adapted to a microprocessor in the field of art that formed the background of the present invention. The present invention, however, is in no way limited thereto but can be utilized for other types of general purpose data processors.

Having thus described the invention, it is now claimed:

1. A data processing system comprising a microcomputer, address bus means, data bus means and a plurality of coprocessors, wherein the microcomputer comprises:
   instruction execution means for executing an instruction;
   control means for controlling said instruction execution means;
   first storage means for indicating a status of the microcomputer, including a storage area, coupled to the address bus means, for storing designation data for indicating at least one of said plurality of coprocessors, said storage area being written to by a user; and,
   second storage means, coupled to the data bus means, for storing command data to be processed in the indicated coprocessor,
   wherein the designation data is formed by a plurality of bits,
   wherein the address bus means couples the microcomputer with the plurality of coprocessors and delivers the designation data to the plurality of coprocessors,
   wherein the data bus means couples the microcomputer with the plurality of coprocessors and delivers the command data to the plurality of coprocessors, and
   wherein each of the plurality of coprocessors has an identification code and means for selectively fetching the command data provided from the microcomputer when the designation data provided from the microcomputer corresponds to the identification code.

2. The data processing system according to claim 1, wherein said command data is stored in a predetermined portion of said second storage means by said control means.

3. A method of coprocessor instruction assignment for use with a computer system having a microprocessor and a plurality of coprocessors, wherein said microprocessor comprises instruction execution means for executing an instruction, control means for controlling said execution means, first storage means for indicating a status in the microprocessor, having an area which is read and written by a user and which stores designation data for indicating at least one coprocessor of the plurality of coprocessors, second storage means for storing command data to be processed in the indicated at least one coprocessor in accordance with said designation data, first external terminals coupled to said second storage means and said plurality of coprocessors; and, second external terminals coupled to said first storage means and said plurality of coprocessors, each coprocessor having a unique identification data for discriminating between individual coprocessors from said plurality of coprocessors, the method comprising the steps of:
   (a) storing said designation data in said first storage means;
   (b) storing said command data in said second storage means;
   (c) transferring said designation data to the plurality of coprocessors through said second external terminals and said command data to the plurality of coprocessors through said first external terminals;
   (d) comparing, at each of the plurality of coprocessors, said transferred designation data with said coprocessor unique identification data to thereby select at least one coprocessor from said plurality of coprocessors as the indicated coprocessor; and
   (e) fetching said command data in the indicated coprocessor from the first external terminals.

4. The method of coprocessor instruction assignment according to claim 3, further comprising the steps of:
   writing the command data to a data bus directly coupled to said first external terminals and to said plurality of coprocessors; and,
   writing the designation data to address lines directly coupled to said second external terminals and to said plurality of coprocessors.

5. The method of coprocessor instruction assignment according to claim 4, wherein said storing steps are executed substantially in synchronism with each other, and then said transferring steps are executed substantially in synchronism with each other.

6. The microprocessor system according to claim 2, wherein said first storage means comprises a register.

7. A microprocessor system comprising:
   a first microprocessor having (i) a first memory means for storing command data, (ii) a second memory means for indicating a status in the microprocessor, having a portion which is written by a user and which stores designation data, and (iii) means for sending the command data and the designation data to a plurality of second microprocessors within the microprocessor system; and,
   wherein each of the second microprocessors has (i) a unique identification data code for discriminating between the plurality of second processor, and (ii) means for fetching the command data sent from said first microprocessor when said unique identification data code corresponds to the designation data sent from said first microprocessor.

8. The microprocessor system according to claim 7, wherein said second memory means comprises a register.

9. A microprocessor system comprising:
a first microprocessor;
a second microprocessor having a first identification data code;
a third microprocessor having a second identification data code; and,
address lines and a data bus for coupling said first microprocessor, said second microprocessor and said third microprocessor,
wherein said first microprocessor has first storage means coupled to said address lines, having a portion which is written by a user, and which stores a designation data for designating a one of said second microprocessor and said third microprocessor and second storage means, coupled to said bus, for storing a command data for execution by the designated microprocessor.

10. The microprocessor system according to claim 9, wherein said second microprocessor comprises means for selectively receiving said command data based upon a second processor designation data that designates the second microprocessor, and said third microprocessor comprises means for selectively receiving said command data based upon a third processor designation data that designates the third microprocessor.

11. The method according to claim 10, further comprising maintaining the predetermined data in a register.

12. A method for identifying a coprocessor among a plurality of coprocessors interfaced with a microprocessor, wherein each of the coprocessors has an identification code, the method comprising the steps of:
a) reading coprocessor instructions from a storage means by the microprocessor;
b) transferring the read coprocessor instructions to a first bus coupled to the microprocessor and to the plurality of coprocessors;
c) maintaining in a memory a predetermined designation data which designates a one of the plurality of coprocessors, the memory being in an area which is written by a user and which is included in a status register for indicating a status of the microprocessor;
d) transferring the designation data from the area of the status register to the plurality of coprocessors via a second bus; and,
e) selectively fetching the coprocessor instructions in a predetermined coprocessor when the identification code in said predetermined coprocessor corresponds to the transferred designation data.

13. The method of claim 12, wherein the steps b) and d) occur concurrently.

* * * * *